Oct. 17, 1939.   C. D. SKINNER ET AL   2,176,364
EXTRUDING PRESS
Filed March 12, 1937   2 Sheets—Sheet 2
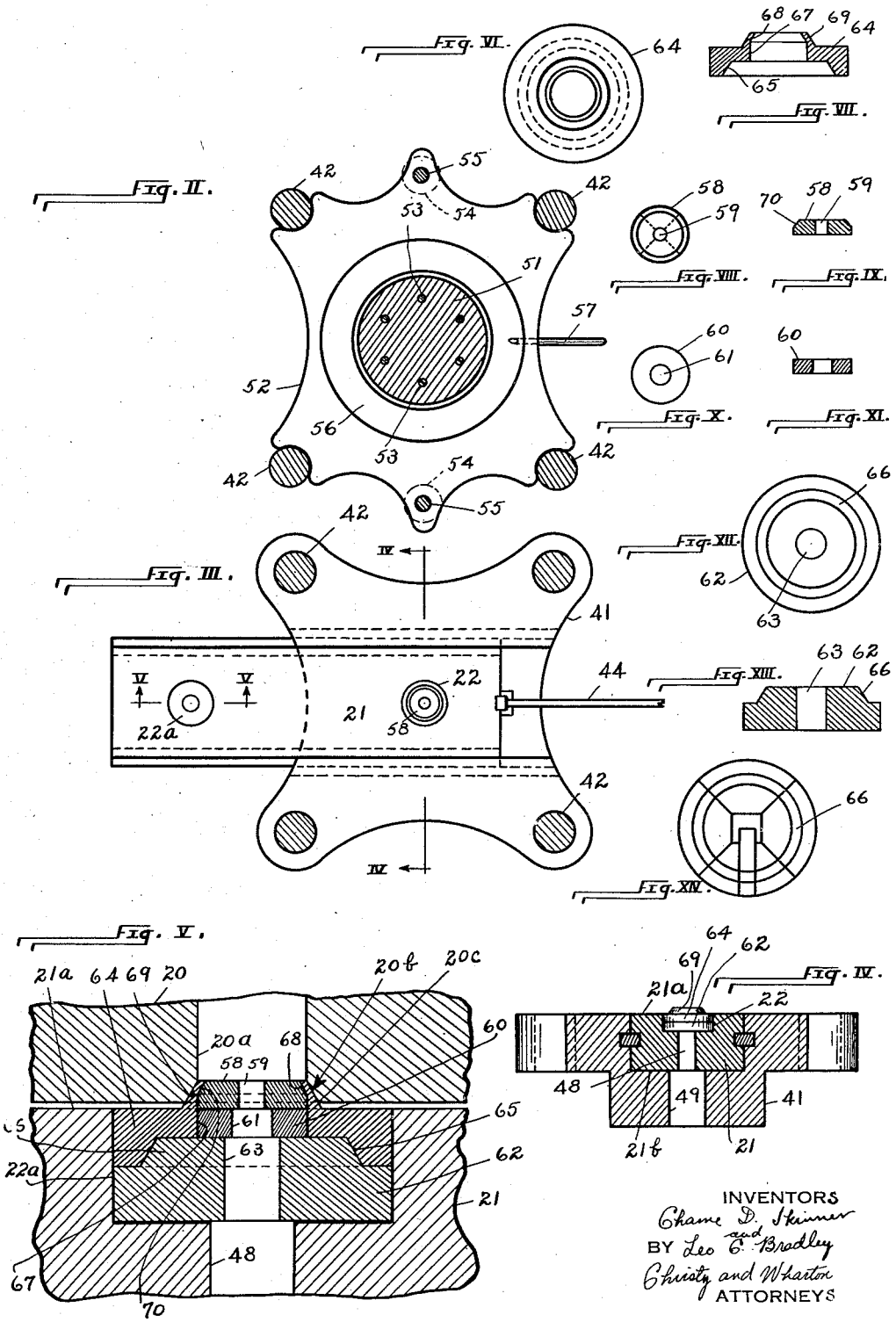
INVENTORS
Chame D. Skinner
and Leo C. Bradley
BY Christy and Wharton
ATTORNEYS Patented Oct. 17, 1939

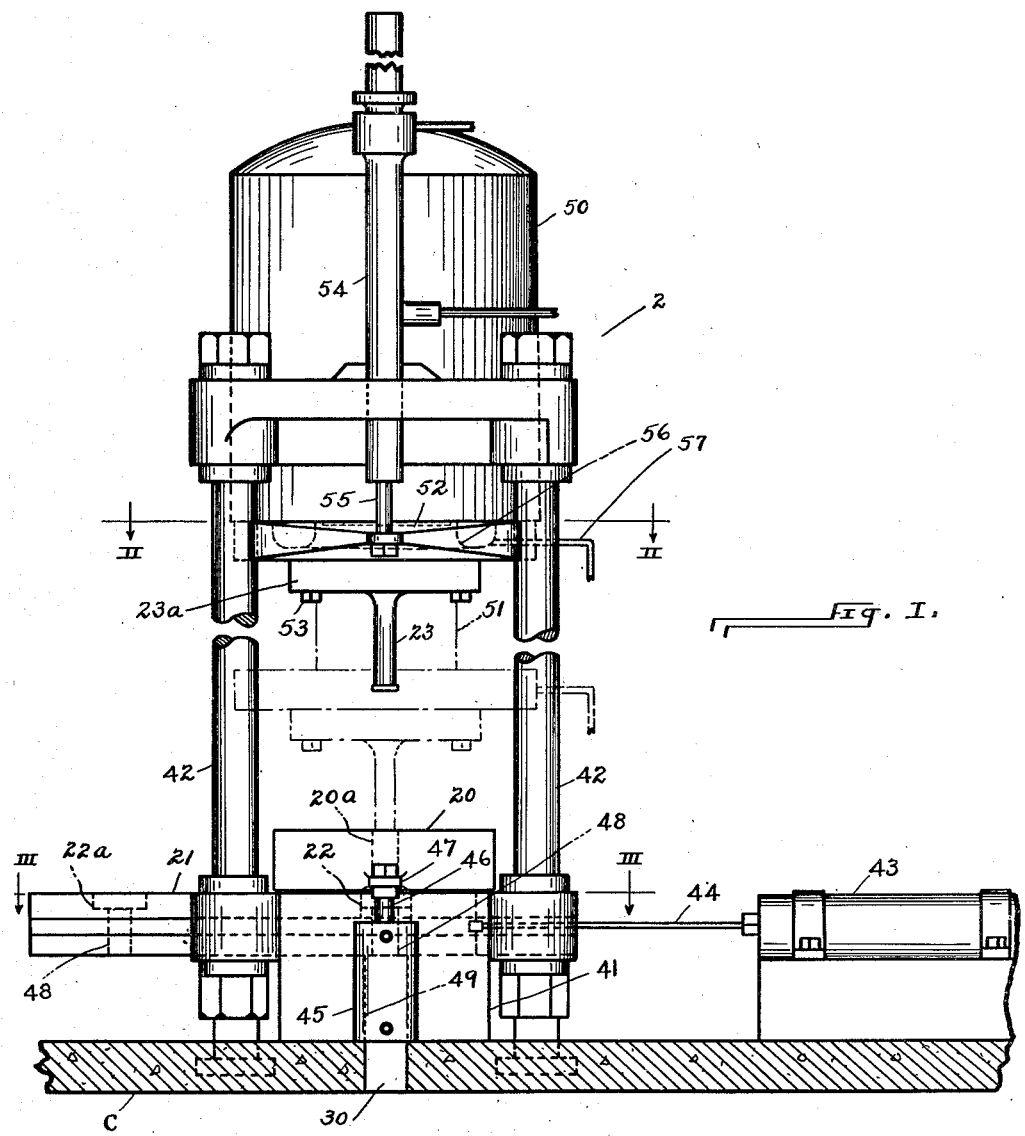

2,176,364

UNITED STATES PATENT OFFICE 2,176,364

EXTRUDING PRESS

Chame D. Skinner, Springdale, and Leo C. Bradley, New Kensington, Pa.

Application March 12, 1937, Serial No. 130,568

9 Claims. (Cl. 207—9)

Our invention relates to the extrusion of tubing, bars, and other elongate articles, either hollow or solid. More particularly the invention relates to the extrusion of aluminum, and consists in certain refinements and elaborations in extruding press construction.

In extruding presses of the usual sort the work is extruded in either vertical or horizontal direction, but for several reasons, as may be noted in our co-pending application Serial No. 130,569, filed March 12, 1937, extrusion in vertical direction is preferable. Our invention is particularly, although not exclusively, directed to vertical presses—so-called tower presses—for the extrusion of aluminum.

A vertical extrusion press essentially includes a bed or platen, supporting a locking plate (sometimes called a stripper plate) carrying an extrusion die. An extrusion cylinder is assembled in axial alignment with the extrusion die, and a hydraulic cylinder is arranged above the extrusion cylinder for powerfully moving a plunger downward into the extrusion cylinder, to force the metal to be extruded from the cylinder and through the die. In working aluminum it is important that the extrusion cylinder and die shall not be chilled, and for this reason it is desirable, if not essential, that water escaping in usual way from the hydraulic cylinder above shall not rain down upon the extrusion cylinder and die below. Our press embodies means that guard against such escape of water.

The invention consists in refinements in the structure and organization of extrusion dies and in the locking plate and bed or platen that carry the dies, whereby the dies may be more economically manufactured, and may more readily be interchanged in assembly with the extrusion cylinder.

An embodiment of the invention is illustrated in the accompanying drawings, in which Fig. I is a view of a tower press in side elevation, showing the supporting floor or base for the press in vertical section; Fig. II is a view in plan of the crosshead of the press, taken on the plane II—II of Fig. I; and Fig. III is a view on the plane III—III of Fig. I, showing the platen and locking plate of the press in plan from above. Fig. IV is a sectional view of such platen and locking plate, taken on the plane IV—IV of Fig. III. Fig. V is a fragmentary sectional view, taken on the plane V—V of Fig. III, and showing to larger scale the assembly of an extrusion die in the locking plate, and additionally indicating the extrusion cylinder in position of cooperation with the die; Fig. VI is a view in plan (to smaller scale than Fig. V) of a keeper ring employed in the assembly of the extrusion die with the locking plate; Fig. VII is a view in axial section of the same; Figs. VIII and IX are similar views of the extrusion die; Figs. X to XIII, inclusive, are similar views of a back-up block and a base-block, respectively, used in the assembly of the extrusion die and keeper ring in the locking plate; and Fig. XIV is a view in plan of the base-block modified in certain particulars.

Referring to Fig. I of the drawings, the extrusion press typically consists of a basal platen 41, secured upon a base or floor C, and providing rigid mounting for the lower ends of four vertical standards 42. A slide or locking plate 21, including in this case two die-pockets 22 and 22a, is arranged in platen 41 for sliding adjustment in horizontal plane, and the plunger 44 of a hydraulic power cylinder 43 is arranged powerfully to effect such adjustment. The plunger 44 secured at its distal end to the right-hand end of the locking plate 21, as shown in Fig. III. The supply of fluid under pressure—usually it will be water—for operating the power unit 43 is controlled in known way by means that do not appear in the drawings.

As will later appear more fully, each pocket 22, 22a is adapted to house an extrusion die, and, by sliding adjustment of the locking plate, one or the other of the die-pockets may be positioned in registry with the bore 20a of an extrusion cylinder 20 mounted above the locking plate and platen. It will be understood, when one of the two die-pockets is in axial registry with the extrusion cylinder 20, that the other pocket lies accessible to the side of the machine. Thus a mechanic may assemble any desired die in the accessible pocket and preheat it to service temperature, while the die in the companion pocket is in service beneath the extrusion cylinder. As may be understood upon reference to Fig. I, a vertical power cylinder 45 is mounted at the front of platen 41, and a duplicate cylinder (not shown) is mounted at the rear. The plungers 46 of these two cylinders 45 are secured to lugs 47 integrated with opposite sides of the extrusion cylinder 20, and normally these two power units 45, 46, operated by water under pressure, serve to exert great downward pull on the extrusion cylinder and hold it in secure assembly with the locking plate (and the included extrusion die) beneath. In service one or more billets of aluminum (or other metal to be extruded) is introduced at extruding temperature—900 to 950° F. in the case of aluminum—to the bore 20a of the extrusion cylinder, and then an extrusion plunger 23 is caused powerfully to descend into the cylinder, thereby forcing the metal through the extrusion die 58 (Fig. V) supported in locking plate 21 at the bottom of the extrusion cylinder. A passage 48 opens downward from the pocket (22 or 22a) supporting the die, a passage 49 (Fig. IV) opens through the platen 41 of the press, and a passage 30 (Fig. I) opens through the floor C, to permit of the vertically downward movement of the extruded article, as disclosed in our said co-pending application.

More specifically, a hydraulic power cylinder 50 is mounted and secured upon the upper terminals of the cylindrical standards 42, and a horizontal cross-head 52 is mounted upon the lower end of a power piston 51 which is reciprocable within such power cylinder. The cross-head engages the standards 42 as indicated in Fig. II, and the four standards, extending vertically and in parallelism, provide a guide-way for the vertically reciprocable cross head. The extrusion plunger 23 is integrated with a head 23a, and by such head is secured to the cross-head. Note the bolts 53 passing through the body of the cross-head, and into threaded engagement with the lower end of the power piston 51, Figs. I and II. A relatively small auxiliary hydraulic cylinder 54 (Fig. I) is mounted at the front of cylinder 50, and an identical and cooperating cylinder is mounted at the back. The plunger rods 55 of the two auxiliary cylinders 54 are secured at their lower ends to the cross-head 52, and in usual way the inlet and outlet valves (not shown) of the cylinders 50 and 54 are manually controlled. The power unit 50, 51 is operated to effect the descent of the cross-head 52 and extrusion plunger 23, and, alternately, the units 54, 55 are operated in common to elevate the cross-head and extrusion plunger. Due to the relatively great piston displacement in the cylinder 50, the descent of the extrusion plunger into engagement with the body of metal to be extruded in cylinder 20 is relatively slow, and, for the same reason, the exerted force is of relatively great magnitude, as is required in the extrusion of aluminum and the like. When the plunger 23 reaches the bottom of its extruding stroke in cylinder 20, the exhaust valve of cylinder 50 and the inlet valves of cylinders 54 are simultaneously opened, and water under pressure is charged into the bottoms of cylinders 54. The plunger rods 55 rise, carrying the cross-head 52 upward. By virtue of the relatively small piston displacement in the two cylinders 54, the rise of the cross-head 52 and plunger 23 is relatively quick. While the combined upward pull of the two plunger rods 55 is relatively small, it is adequate to elevate the reciprocating parts and displace the water above the power piston in cylinder 50. Further detail of the known construction and operation of the means for reciprocating the extrusion plunger 23 is needless to an understanding of our invention.

As has been already mentioned, it is objectionable for the water escaping between the engaging surfaces of the power cylinder 50 and piston 51 to drip upon extrusion cylinder 20. In overcoming this objection, we mount on the piston 51 a horizontal receiver for such escaping water, and advantageously the receiver consists in an annular recess 56 formed in the body of the cross-head 52. The annular recess 56, concentric with respect to the lower end of the power piston 51, is open from above, and all water, escaping from the cylinder 50 and running down the side surface of the piston, drains into such recess. Escape is provided for the collected water, and, conveniently, such escape is found in drain-tube 57 extending outward from the recess 56 and serving to conduct the water away from position above the extrusion cylinder 20.

Turning to Figs. V to XIV, our particularly effective organization of the extrusion dies in the pockets 22, 22a of the locking plate 21 will be considered. The reference numeral 58 is applied to the extrusion die proper, which consists in a body of high grade steel of known sort, provided with a bore 59. The bore in this case is cylindrical, and, by subjecting a billet of metal to the compression of plunger 23 in the extrusion cylinder 20, a solid rod of round section is extruded through the die. Solid bars of other cross section, and tubular articles, may in known way be extruded by employing dies having appropriately shaped bores or matrices. The extrusion die rests immediately upon a cylindrical back-up block 60; the block 60 rests upon a base-block 62, and the base-block rests upon the floor of the pocket (22 or 22a) in the locking plate 21. The blocks 60 and 62 are provided with throats 61 and 63, respectively, that are axially aligned with the bore 59 of the extrusion die and the bore 48 which opens downward through the locking plate and communicates with the bore 49 in platen 41, providing a passage for the vertically extruded article. A keeper ring 64 serves, in conjunction with the extrusion cylinder 20, to secure the die assembly firmly in place in the locking plate, and it is important to note that the keeper ring includes an internally tapering shoulder 65 that snugly engages a correspondingly tapered annulus 66 integral with the base-block 62. Above the shoulder 65, the keeper ring includes a cylindrical bore 67, terminating at its upper end in an inwardly inclining taper 68. The body of the keeper ring projects upward from the face 21a (Fig. V) of the locking plate, in an external, tapering shoulder 69. The back-up block 60 and the extrusion die 58 nest within the bore 67 of the keeper ring, and the otherwise cylindrical die is chamfered at 70 for snug engagement with the tapered portion 68 of the keeper ring bore. By virtue of this structure the die, back-up block, and base-block are interengaged and held in precise axial alignment, and it is impossible for the parts to shift under the stress of service. It is further of importance to note that the base of the extrusion cylinder bore 20a is tapered, at 20b, whereby the body of the extrusion cylinder, under its own weight and augmented by the downward pull of plunger units 45, 46 (Fig. I), bears with circumferential wedging effect upon the die assembly. Thus, the extrusion die and back-up blocks are accurately centered and rigidly secured on the axis of the extrusion cylinder 20. And by virtue of such structure it becomes feasible to construct extrusion dies in segments, as indicated by the radial dotted lines in Fig VIII. Additionally, the base-block 62 may be made in sections, as shown in plan in Fig. XIV, each section including a segment of the annular shoulder 66, that in assembly is engaged by tapering shoulder 65 of the keeper ring. As may be realized from the drawings, our keeper ring is effective to secure the segments of a multi-part die and base-block in proper juxtaposition. To the extent that the segmental construction of dies and blocks is economical and facilitates manufacture, and to the extent that the die segments may be standardized and made interchangeable, to obtain various bore sections without the manufacture of entirely new dies, it will be understood that the above-described refinements and elaborations are advantageous and valuable.

As already mentioned, one of the pockets (22 or 22a) in the locking plate is accessible at the side of the machine, while the other is in position of service beneath the extrusion cylinder, whereby an attendant may install and preheat a die for new work, while the press is still in operation on work of other specifications. In converting the machine from the extrusion of one type of work to another, it is merely necessary to elevate the extrusion plunger 23, raise the extrusion cylinder 20 (by means of power units 45, 46) to a position above the tapered shoulder 69 of the keeper ring 64, and, by means of power unit 43, 44, shift the locking plate 21, to remove the old die assembly from beneath the extrusion cylinder and bring the new die assembly into place. The extrusion cylinder is then powerfully lowered into engagement with the new die assembly, and the press is ready to continue operation. Thus, the time required for the conversion is reduced to a minimum.

There is still another noteworthy advantage of our structure. Upon interrupting the normal operation of the press, to change dies, there is found a residual quantity of billet metal remaining in the extrusion cylinder; the bore of the die 58 is filled with metal, and the upper portion of the article last extruded, still integral with the metal filling the bore of the die, extends downward in passage 61, 63, 48, 49. When the extrusion cylinder 20 is elevated and the locking plate is powerfully shifted in a direction transverse to the line of movement of the extrusion cylinder, the top faces of the die 58 and keeper ring portion 69 slide against the nether face of the elevated extrusion cylinder, in such manner that this residual metal is sheared at the mouth of the die bore 59 (Fig. V). More specifically, the upper peripheral edge of keeper ring portion 69 cooperates with the lower peripheral edge 20c of extrusion cylinder bore 20a in shearing the residual metal. In like manner the nether face of the locking plate 21 slides over the floor of the slideway 21b (Fig. IV) in the basal platen 41 of the press, and the upper peripheral edge of stationary bore 49 cooperates with the lower edge of bore 48 in the horizontally shifted locking plate, to shear the body of the extruded article depending from the die 58. Accordingly, little or no time is lost in cutting metal, preparatory to changing dies.

The several features of our invention have been described above in exemplary way. Manifestly, various modifications may be devised and employed without departing from the essence of the invention defined in the appended claims.

We claim as our invention:

1. In an extrusion press including a vertical extrusion cylinder open at upper end to receive an extrusion plunger and open at lower end to receive an extrusion die, an extrusion plunger, a power cylinder for driving said plunger into said extrusion cylinder, a bed arranged below said extrusion cylinder and rigidly integrated with said power cylinder above, said bed including a slideway, a slide mounted in said slideway and including a plurality of die-pockets, extrusion dies in said pockets; means for shifting said slide in said slideway transversely of the axis of said extrusion cylinder, to move one of said dies from position of axial alignment with the lower end of said extrusion cylinder, and carry another of said dies into such position of axial alignment.

2. In an extrusion press including a vertical extrusion cylinder open at upper end to receive an extrusion plunger and open at lower end to receive an extrusion die, an extrusion plunger, a power cylinder for driving said plunger into said extrusion cylinder, a bed arranged below said extrusion cylinder and rigidly integrated with said power cylinder above, said bed including a slideway, a slide mounted in said slideway and including a plurality of die-pockets, extrusion dies in said pockets; a reciprocating plunger for shifting said slide in said slideway transversely of the axis of said extrusion cylinder, to move one of said dies from position of axial alignment with the lower end of said extrusion cylinder and carry another of said dies into such position, and means for locking such cylinder upon the die aligned therewith, said last means being adapted to lift said extrusion cylinder from engagement with the die.

3. In an extrusion press including a vertical extrusion cylinder open at upper end to receive an extrusion plunger and open at lower end to receive an extrusion die, an extrusion plunger, a power cylinder for driving said plunger into said extrusion cylinder, a bed arranged below said extrusion cylinder and rigidly integrated with said power cylinder above, said bed including a slideway, a slide mounted in said slideway and including a plurality of die-pockets, extrusion dies in said pockets; means adapted to shift said slide in said slideway transversely of the axis of said extrusion cylinder, to move one of said dies from position of axial alignment with the lower end of said extrusion cylinder and carry another of said dies into such position, and means for axially shifting said extrusion cylinder relatively to the die in alignment therewith, to bring the bottom of such cylinder into shearing relation with respect to the top of the die, whereby, when said slide is shifted, the bottom of said extrusion cylinder and the top of said die cooperate in shearing the metal in the throat of the die from the metal in the extrusion cylinder, substantially as described.

4. The structure of claim 1, in which said bed includes a passage for the extruded work, and in which said slide includes a passage opening downward from the throat of the die mounted therein and normally registering with said passage in the bed, the meeting edges of said passages cooperating during slide movement to provide a shear for severing the extruded work.

5. The structure of claim 1, in which said bed includes a passage for the extruded work, and in which said slide includes a passage opening downward from the throat of said die mounted therein and registering with said passage in the bed, the meeting edges of said passages cooperating during slide movement to provide a shear, whereby, when said slide is powerfully shifted, the extruded work is sheared below the die, while the die cooperates with said extrusion cylinder above the die in freeing the die from the metal in the extrusion cylinder, as described.

6. An extrusion press including an extrusion cylinder, a die-supporting member, a pocket in said member, a perforate base-block in said pocket, said base-block including a tapered shoulder, an extrusion die mounted on said base-block, and a keeper-ring assembled over said die and base-block, said keeper-ring including an internal surface inclined to the axis of the extrusion die and engaging said shoulder of the base-block, said keeper-ring including a second internal surface inclined to the axis of such die, said second inclined surface engaging said extrusion die, and an external tapering surface provided on said keeper-ring for cooperation with the mouth of said extrusion cylinder.

7. The structure of claim 6, together with a perforate backing block interposed between said base-block and said extrusion die within the compass of said keeper-ring.

8. In an extruding press including an extruding cylinder, a die-supporting member, a perforate base-block carried by said member; an extruding die supported by said base-block, said extruding die having an annular, tapered side surface, and a keeper ring adapted to assist in securing the assembly in proper alignment; the refinements described herein in which said base-block is provided with an annular shoulder that is inclined toward the bore of said extruding cylinder, the body of said keeper ring including three annular, tapered surface portions, one comprising an internal annular surface portion snugly engaging said shoulder on the base-block, another comprising an internal annular surface portion inclined toward the bore of said extruding cylinder and snugly engaging the tapered side surface of said die, and the third comprising an external annular surface portion forcefully engaged by the body of said cylinder at the mouth of its bore.

9. The structure of the next-preceding claim, in which said keeper ring in assembly provides between its die-engaging tapered surface portion and the shoulder on said base-block a recess in which a perforate back-up block for said die is rigidly secured.

CHAME D. SKINNER.
LEO C. BRADLEY.